United States Patent
Saxena

(10) Patent No.: US 8,352,570 B2
(45) Date of Patent: *Jan. 8, 2013

(54) METHOD AND SYSTEM FOR UNIFORM RESOURCE LOCATOR TRANSFORMATION

(75) Inventor: Avinash C. Saxena, Plano, TX (US)

(73) Assignee: Parallel Networks, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/535,348

(22) Filed: Aug. 4, 2009

(65) Prior Publication Data

US 2010/0161762 A1 Jun. 24, 2010

Related U.S. Application Data

(63) Continuation of application No. 09/640,478, filed on Aug. 16, 2000, now Pat. No. 7,571,217.

(51) Int. Cl.
*G06F 15/16* (2006.01)
(52) U.S. Cl. .......................... 709/217; 709/216
(58) Field of Classification Search .................. 709/217, 709/216
See application file for complete search history.

(56) References Cited

U.S. PATENT DOCUMENTS

| | | | |
|---|---|---|---|
| 5,764,906 A * | 6/1998 | Edelstein et al. ............ | 709/219 |
| 5,802,299 A | 9/1998 | Logan et al. | |
| 5,864,852 A | 1/1999 | Luotonen ....................... | 707/10 |
| 5,991,810 A | 11/1999 | Shapiro et al. ............... | 709/229 |
| 6,029,175 A | 2/2000 | Chow et al. | |
| 6,122,666 A | 9/2000 | Beurket et al. | |
| 6,185,598 B1 | 2/2001 | Farber et al. | |
| 6,199,107 B1 | 3/2001 | Dujari | |
| 6,253,234 B1 | 6/2001 | Hunt et al. | |
| 6,289,358 B1 * | 9/2001 | Mattis et al. .................. | 707/695 |
| 6,389,460 B1 | 5/2002 | Stewart et al. | |
| 6,389,462 B1 | 5/2002 | Cohen et al. | |
| 6,397,259 B1 | 5/2002 | Lincke et al. | |
| 6,513,062 B1 | 1/2003 | Weber | |
| 6,587,928 B1 | 7/2003 | Periyannan et al. | |
| 6,591,266 B1 * | 7/2003 | Li et al. ............................ | 1/1 |
| 6,640,240 B1 | 10/2003 | Hoffman et al. | |
| 6,701,415 B1 | 3/2004 | Hendren | |
| 6,757,708 B1 * | 6/2004 | Craig et al. ................... | 709/203 |
| 7,096,418 B1 * | 8/2006 | Singhal et al. ................ | 715/205 |

OTHER PUBLICATIONS

Notification of Transmittal of the International Search Report (PCT Rule 44.1) mailed Jan. 4, 2002 corresponding to International Appln. No. PCT/US 01/41740 filed Aug. 14, 2001, pp. 1-7.

*Hypertext Transfer Protocol—HTTP/1. 1*, XP-002159137, Network Working Group, Category: Standards Track, R. Fielding, et al., pp. 1-114, Jun. 1999.

Apache HTTP Server Version 1.3, "Module mod_rewrite URL Rewriting Engine", http://httpd.apache.org/docs/1.3/mod/mod_rewrite.html 22 pages, Printed Sep. 29, 2011.

* cited by examiner

*Primary Examiner* — Kevin Bates
(74) *Attorney, Agent, or Firm* — Baker Botts L.L.P.

(57) ABSTRACT

A web browser (20) at a client (12) generates a request (26) for content from an origin server (18). A cache server (16) intercepts the request and examines the request to determine whether the request should be transformed. More specifically, the cache server compares transform criteria (40) to a uniform resource identifier portion (28) and a header portion (30) associated with the request. By transforming the request such that information in the header portion is included in the uniform resource identifier portion, the cache server can cache the content associated with the request using the uniform resource identifier portion of the request.

21 Claims, 1 Drawing Sheet

| MATCH CRITERIA | TRANSFORM |
|---|---|
| www.domain.com | APPEND "LANGUAGE FIELD" |
| .domain.com | INSERT "BROWSER TYPE" |
| .*domain.com<br>.domain.*<br>.domain*.*<br>.*domain?.com<br>:domain.com/DATA/CAR*.html<br>www.domain.com:<br>LANGUAGE=* | •<br>•<br>• |

100 / 102 / ~40

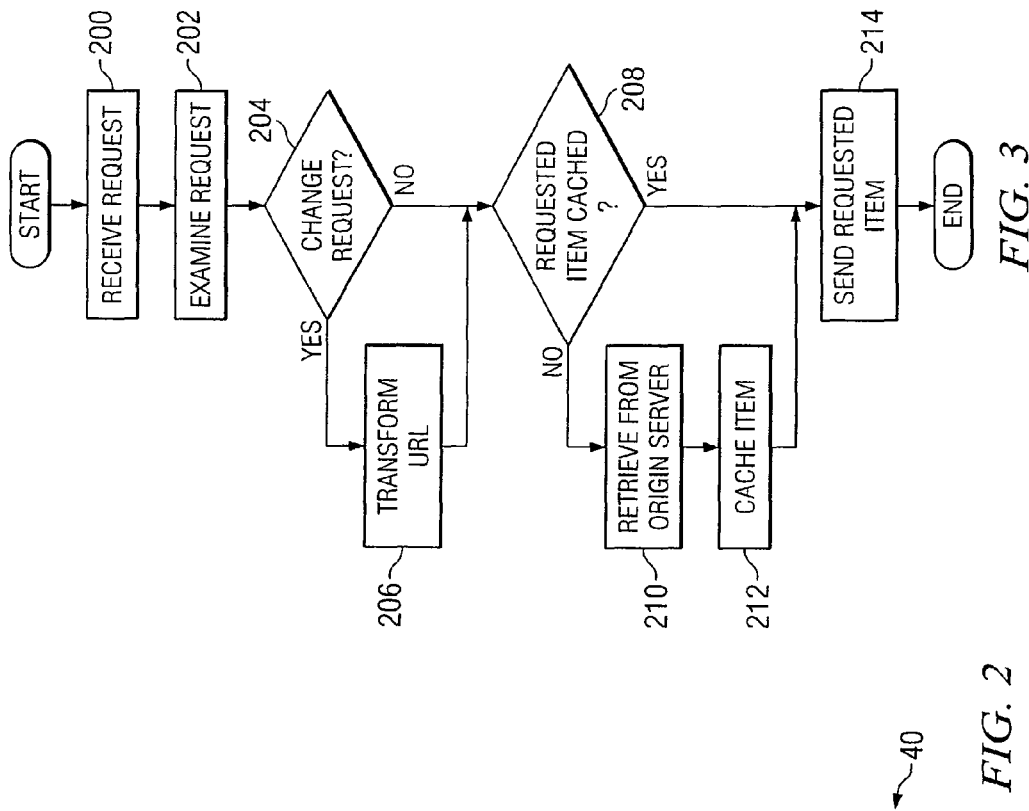
FIG. 3
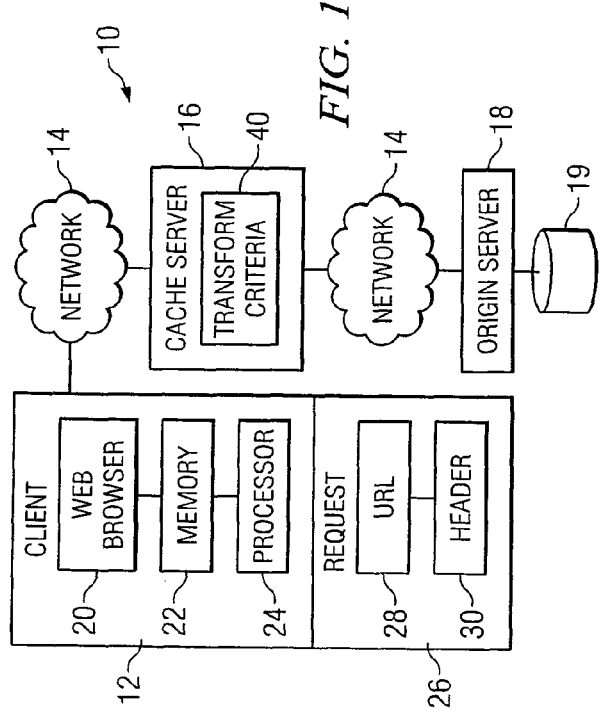
FIG. 2
FIG. 1

METHOD AND SYSTEM FOR UNIFORM RESOURCE LOCATOR TRANSFORMATION

RELATED APPLICATIONS

This is a continuation application of U.S. application Ser. No. 09/640,478, now U.S. Pat. No. 7,571,217, which is incorporated herein by reference.

TECHNICAL FIELD OF THE INVENTION

This invention relates generally to the field of data processing and, more particularly, to a method and system for uniform resource locator transformation.

BACKGROUND OF THE INVENTION

As computers have grown increasingly important in today's society, the use of the Internet has also increased. The increased usage of the Internet has lead to a decrease in response time as busy web sites attempt to handle a large volume of traffic.

One solution to handling large amounts of traffic at popular web sites is to cache frequently requested content from the web site at the user's computer and/or at other sites. By spreading the content requests around an increased number of locations, performance is improved by decreasing the load at a single web site.

One of the limitations to many existing caching solutions is the inability to cache content that varies based on information in the request header as opposed to the uniform resource locator (URL) indicating the content item. For example, a popular site such as Yahoo may provide localized versions of web pages based on the language information in the header of the hypertext transport protocol (HTTP) request while using the same URL.

SUMMARY OF THE INVENTION

The present invention addresses the problems and disadvantages associated with prior systems. In particular, the present invention provides a method and system for uniform resource locator transformation.

One aspect of the invention is a method for communicating data comprising receiving a first request at a cache server. The first request has an associated first content item and has an associated header portion. The method further includes comparing the first content item and the header portion to predefined criteria. In addition, the method includes generating a second request based on the criteria, the header portion and the first content item, the second request being associated with a second content item, and retrieving the second content item based on the second request.

Another aspect of the invention is a system for communicating data comprising a computer readable memory and an application stored in the computer readable memory. The application is operable to receive a first request at a cache server. The first request has an associated first content item and has an associated header portion. The application is further operable to compare the first content item and the header portion to predefined criteria. In addition, the application is operable to generate a second request based on the criteria, the header portion and the first content item, the second request being associated with a second content item, and retrieve the second content item based on the second request.

The present invention provides important technical advantages. Various embodiments of the invention may have none, some, or all of these advantages. One such technical advantage is the capability for transforming the uniform resource locators (URLs) portion of a hypertext transport protocol (HTTP) request using information in the header portion of the HTTP request. Including header information in the URL portion allows for the caching of header dependent content items. Thus, a site which returns different content based on, for example, language information in the header portion, using the same URL of, for example, "http://www.domain.com/" may now be cached.

BRIEF DESCRIPTION OF THE DRAWINGS

For a more complete understanding of the present invention, the objects and advantages thereof, reference is now made to the following descriptions taken in connection with the accompanying drawings in which:

FIG. 1 is a block diagram illustrating a uniform resource locator transformation system;

FIG. 2 is a chart illustrating an exemplary embodiment of transform criteria used with system of FIG. 1 for transforming uniform resource locators; and FIG. 3 is a flow chart illustrating a method of transforming URLs using the system of FIG. 1.

DETAILED DESCRIPTION OF THE INVENTION

A better understanding of the present invention will be realized from the detailed description that follows, taken in conjunction with the accompanying drawings.

FIG. 1 is a block diagram illustrating a uniform resource locator (URL) transformation system 10. System 10 comprises a client 12, a network 14, a cache server 16 and an origin server 18. System 10 is operable to provide the capability to transform URLs used with the hypertext transport protocol (HTTP) and the hypertext markup language (HTML) such that information used by a World Wide Web (web) server in the HTTP header is included in the uniform resource identifier (URI) portion of an HTTP request. Typically, caching systems use the URI portion of an HTTP request to identify cached content items. However, caching systems are reduced in effectiveness when origin servers 18 provide differing content based on information in the HTTP header portion of the HTTP request because the cache system caches on the URI, not the header information. System 10 provides the capability to transform the URI portion of the HTTP request to include information from the header portion of the HTTP request so that caching systems can cache header-dependent content items.

Client 12 comprises a general purpose or specialized computing system operable to receive information from a user (not shown), such as a Microsoft Windows based computer, a UNIX or Linux based computer or a Macintosh computer. Client 12 may also comprise a web browser 20 stored in a computer readable memory 22 and executed by a processor 24. Web browser 20 comprises any suitable HTTP client and is operable to generate one or more HTTP requests 26. Browser 20 communicates with cache server 16 over network 14, and transmits and receives data to and from server 16. HTTP request 26 comprises a URI portion 28 and a header portion 30.

In the disclosed embodiment, URI portion 28 comprises a URL identifying the content requested by browser 20. For example, URI portion 28 may comprise "http://www.domain.com/index.html". In the disclosed embodiment, header portion 30 comprises header information included in an HTTP request. For example, header portion 30 may comprise "content type=application/x-zip" or "language=en-us".

Typically, users of a web browser, such as browser 20, identify a desired web page by the URL associated with the web page. In addition, a link to a second web page from a first web page specifies the second web page by the URL associated with the second web page. However, when the URL seen by the user is communicated to the server hosting the desired web page, the URL seen by the user is not the only information communicated. More specifically, the URL seen by the user forms a portion of the full http request sent to the web server hosting the desired web page.

The full http request includes a header, such as header portion 30, and the URL seen by the user, such as URI portion 28. The header includes various information not included in the URL which is useful and sometimes necessary for proper handling of the http request and proper presentation to the user of the content referred to by the URL in the http request. The information included in the header may include the identity (formally, the "User-Agent") of the browser being used, such as Internet Explorer version 4.2 or, more formally, "CERN-LineMode/2.15 libwww/2.17b3". The header may also indicate the language (formally "Content-Language") that the user of the browser prefers, such as English or Japanese. The header may also indicate various other fields such as cache-control, connection, date, pragma, trailer, transfer-encoding, upgrade, via, warning, allow, content-encoding, content-length, content-location, content-md5, content-range, content-type, expires, last-modified, extension-header, accept, accept-charset, accept-encoding, accept-language, authorization, expect, from, host, if-match, if-modified-since, if-none-match, if-range, if-unmodified-since, max-forwards, proxy-authorization, range, referer and other header information. For more detailed information regarding http requests and http header information, see Request For Comments 2616 available at <http://www.w3.org/Protocols/> which is incorporated herein by reference. Often, header information is based on the choices made by a user of a web browser in the "Preferences" or "Options" portion of the web browser.

Many web sites use the header information to select the content to present to the user in response to the http request. Note that for increased clarity, the following example may deviate from the formal requirements of an http request, however, properly formatted http requests are included within the scope of the invention. For example, "http://www.server.com/index.html" is a URL requesting the "index.html" content at "www.server.com". The URL is part of a first http request which may also indicate "Content-Language=Japanese" in the header portion to indicate that the user of the web browser which generated the http request prefers content to be presented in the Japanese language. When the web server at "www.server.com" receives the above first http request, the web server may examine both the header portion and the URL portion in determining which content to present. More specifically, multiple "index.html" web pages may be maintained at the web server for different languages. Thus, in response to the first http request, the web server provides the Japanese language version of "index.html" based on the information in the header portion. Continuing the above example, a second http request may have the same URL ("http://www.server.com/index.html"), but "Content-Language=English". In response to the second http request, the web server may provide an "index.html" page in the English language. This example illustrates how a single URL ("http://www.server.com/index.html") can be interpreted at a web server to return distinct web pages based on information in the header portion of the http request.

One problem experienced by existing caching systems is the inability to cache content that changes based on header information. This problem exists because caching systems typically identify cached content using only the URL associated with the content, not the header information. When "http://www.server.com/index.html" actually identifies multiple web pages, the cache system is unable to determine which of the multiple web pages to return because the header information is not included in the URL. The teachings provided herein involve a method and system for uniform resource locator transformation which would allow a cache system to cache header-dependent content, such as the "http://www.server.com/index.html" content described above.

Network 14 comprises a data communication system operable to communicate data between client 12, cache server 16 and origin server 18. Network 14 is shown in FIG. 1 in two parts only to indicate a logical distinction between the communications path following between client 12 and cache server 16, and cache server and origin server 18. However, network 14 may comprise a single network. For example, network 14 may be the Internet, an asynchronous transfer mode ("ATM") network, an Ethernet network, a Transmission Control Protocol/Internet Protocol (TCP/IP) network, an intranet or any other suitable computer networking technologies. For purposes of teaching the present invention, an exemplary embodiment will be described where network 14 comprises the Internet.

Cache server 16 comprises any suitable combination of hardware and/or software operable to cache static and/or dynamic content items. Cache server 16 further comprises transform criteria 40. Transform criteria 40 comprises rules and directives for transforming URLs received from clients 12 based on web browser 20, the destination origin server 18, and other information. For example, transform criteria 40 may comprise a table indicating the transformations to be applied. Cache server 16 is further operable to provide web server capabilities similar to those of origin server 18 for handling requests 26.

Origin server 18 communicates with cache server 16 over network 14. Origin server 18 comprises any suitable hardware and/or software executing on a computer for receiving and responding to requests 26. Origin server 18 may comprise a single computer executing software or may comprise a plurality of computers each executing software. In the disclosed embodiment, origin server 18 comprises an HTTP server which may also be known as a web server. Origin server 18 may additionally support other protocols such as the file transfer protocol (FTP). Origin server 18 retrieves information from one or more data sources 19 in response to requests 26. Origin server 18 is operable to retrieve static content, such as prewritten text files, images, and web pages, from data sources 19 in response to requests 26. Origin server 18 is also operable to generate new, dynamic content, for example, by dynamically creating web pages based on content stored in the data sources 19 in response to requests 26. For example, origin server 18 may generate a new web page using a common gateway interface (CGI) script, generate a new web page from the result of a structured query language (SQL) request and perform other suitable content generation functions. Origin server 18 may also be operable to generate executable software, such as applications and applets, in response to requests for data. For example, origin server 18 may generate a Java applet in response to an appropriate request 26.

In operation, browser 20 generates request 26 for content from origin server 18. Cache server 16 intercepts request 26 from web browser 20 to origin server 18. For example, cache server 16 may intercept request 20 by having the domain name service (DNS) server direct request 26 for the Internet domain associated with origin server 18 to cache server 16. Stated another way, requests 26 addressed to origin server 18 may be routed to cache server 16 through the operation of the DNS server.

After receiving request 26, cache server 16 examines URI portion 28 and header portion 30 and compares it to transform criteria 40. Criteria 40 specifies which requests 26 to perform transformation on and how to transform selected requests 26. Criteria 40 may identify requests 26 to be transformed based on information in either or both of URI portion 28 and header portion 30. More specifically, criteria 40 may indicate that information be added to request 26 and/or that information be deleted from request 26. For example, criteria 40 may specify that if "www.domain.com" is found in URI portion 28 and "language=Japanese" is found in header portion 30, that request 26 be transformed to include the language information found in header portion 30 in URI portion 28 so that cache server 16 can cache the content associated with request 26. For another example, criteria 40 may specify that if "www.domain.com/acct.cgi?user_id=Mike" is found in URI portion 28, that request 26 be transformed to remove the user_id information from URI portion 28. By removing information, user dependent data, such as user identifiers, may be removed from URI portion 28 and allowing more efficient caching of web pages. More specifically, by removing the user dependent identifier information in the above example, only one copy of the page associated with "www.domain.com/acct.cgi?user_id=Mike" need be cached because once the user identifier information is removed, only "www.domain.com/acct.cgi" may remain which would indicate a single web page instead of multiple web pages. In general, any of the elements of header portion 30, such as cache-control, connection, date, pragma, trailer, transfer-encoding, upgrade, via, warning, allow, content-encoding, content-length, content-location, content-md5, content-range, content-type, expires, last-modified, extension-header, accept, accept-charset, accept-encoding, accept-language, authorization, expect, from, host, if-match, if-modified-since, if-none-match, if-range, if-unmodified-since, max-forwards, proxy-authorization, range, referer [sic] and other header fields, may be associated with any portion, substring or other part of URI portion 28 to indicate how to transform requests 26. Further details of criteria 40 are discussed in association with FIG. 2. Typically, criteria 40 for a particular origin server 18 will be configured using information from an administrator associated with the origin server 18 as the administrator will know which particular web pages and other content are identified by a single URL, but depend on header information.

After request 26 has been transformed according to transform criteria 40, cache server 16 examines URI portion 28 to determine whether the requested content has been cached at cache server 16. Since URI portion 28 has been transformed, any header information needed to identify the particular content to be retrieved is now available in URI portion 28. Cache server 16 can then uniquely identify content that is header dependent using only the URI portion 28 to identify the content. For example, a initial URI portion 28 of "http://www.server.com/index.html" and a header portion 30 of "Language=Japanese" may have been transformed into a new URI portion 28 of "http://www.server.com/index.html?Language=Japanese" to identify the Japanese language version of the "http://www.server.com/index.html" web page. Continuing the above example, a further request 26 with an initial URI portion 28 of "http://www.server.com/index.html" and a header portion 30 of "Language=English" may have been transformed into a new URI portion 28 of "http://www.server.com/index.html?Language=English" to identify the English language version of the "http://www.server.com/index.html" web page. This example illustrates how a single URL "http://www.server.com/index.html" which refers to multiple, language dependent web pages, may be transformed to distinctly identify the multiple web pages for caching purposes.

If the requested content has been cached at cache server 16, cache server 16 responds to request 26 with the cached copy of the requested content. If the requested content is not cached at cache server 16, cache server 16 communicates the untransformed version of request 26 to origin server 18. Cache server 16 next receives the requested information from origin server 18. Cache server 16 then transforms request 26 so as to be able to cache the requested content at cache server 16 and to do so transparently to origin server 18. Cache server 16 then communicates the requested content to web browser 20.

FIG. 2 is a table illustrating an exemplary table for transform criteria 40, however, any other suitable implementation for criteria 40 may also be used. Transform criteria 40 may comprise match criteria 100 and an associated transform 102. Match criteria 100 comprises the information in URI portion 28 and header portion 30 that cache server 16 uses to determine which transform criteria 40 to apply to request 26. Match criteria 100 may comprise a URL such as "www.domain.com", which would match that specific machine and domain regardless of the content requested from that domain. Match criteria 100 may also comprise a partial domain name such as ".domain.com" which would match any machine name within domain.com. Match criteria 100 may also utilize wild cards such as "*" and "?". More specifically, the "*" wildcard may indicate any number of any character while the "?" wildcard may indicate a single occurrence of any character, other wildcards may also be used. For example, ".*domain.com" would match any machine in any domain ending with "domain.com" where * represents any number of characters preceding domain.com, thus, "www.mydomain.com" would be matched. For another example, ".domain.*" would match any machine in any generic top level domain (gTLD) with a domain of "domain." For further example, ".domain*.*" would match any machine name in a domain which started with "domain" and ended with any number of characters in any gTLD, thus, "www.domainofmine.com" would be matched, but not "www.mydomain.com". For yet another example, ".domain?.com" would match any machine name in any domain starting with the word "domain" and having a single additional character after the word "domain", thus, "www.domain1.com" would be matched, but not "www.domain22.com". Match criteria 100 may also use wild cards in the content portion of the URL. For example, ".domain.com/data/car*.html" would match any machine name in "domain.com" which requested HTML content items in the data directory which started with the word "car" and followed by any number of characters, thus, "www.domain.com/data/car_porche.html" would be matched. In general, any suitable wildcard scheme, such as regular expression matching, may be used with match criteria 100.

Criteria 40 may also be used to indicate transformations based on the referring web page. Thus, differing content may be provided to users based on how the user arrived at origin server 18. When a referring page includes referral information in URI portion 28 and/or in header portion 30, criteria 40 may indicate a transformation such that differing content is provided based on the referring page. For example, a request 26 with URI portion of "http://www.bookstore.com/index.html" and a header portion 30 including "referer=http://www.preferredsite.com" may be transformed to "http://www.bookstore.com/preferredcustomer_index.html".

Request 26 may be transformed such that users who arrive at "www.bookstore.com" from "www.preferredsite.com" receive preferential treatment because of, for example, a partnership between "www.bookstore.com" and "www.preferredsite.com". In addition, since the "referer" header field may be set regardless of the contents of URI portion 28, web sites can indicate actions to take based on the referring site regardless of the referring site's assistance. In contrast to existing referral programs which typically require the referring site to include identifying information in the URL, by using information in the referring field of header portion 30, the referring site can be identified without participation on the part of the referring site. Further, if a web site wishes to exclude visitors from a particular referring site, the transformation specified in criteria 40 for a particular URI portion 28 and a particular referring site in header portion 30 may direct the user to an access denied page so that users from that particular referring site may be excluded.

Transform 102 comprises an indication of what action to take for the particular match criteria 100. Each transform 102 is associated with one or more match criteria 100. Transform 102 may also indicate multiple actions to be taken. For example, transform 102 may indicate that data in the "language field" be appended to the end of the URI portion 28. For another example, the "browser type" information in header 30 may be inserted in URI portion 28. Transform 102 may also indicate information to be removed from the matched URL. For example, transform 102 may indicate that a "user_id" element of URI portion 28 be removed.

FIG. 3 is a flow chart illustrating a method for transforming requests 26 at cache server 16. The method begins at step 200 where request 26 is received at cache server 16. Next, at step 202, cache server 16 examines request 26 against match criteria 100 in transform criteria 40.

Then, at decisional step 204, cache server 16 determines whether request 26 should be changed. More specifically, if URI portion 28 and/or header portion 30 of request 26 matches any one or more of match criteria 100, cache server 16 will apply transforms 102 associated with the matched element of match criteria 100. For example, a request 26 with a URI portion 28 including "server.domain.com" may match the second exemplary entry of match criteria 100 (FIG. 2). Once a match has been found between one or more entries of match criteria 100 and request 28 of request 26 then server 16 will transform request 26. More specifically, if a match is found between request 26 and match criteria 100 then the YES branch of decisional step 204 leads to step 206. At step 206, cache server 16 transforms URI portion 28 of request 26 according to each match criteria 100 matched in step 204 according to the transform 102 associated with the matched elements of match criteria 100. If no matches are found between URI portion 28 and match criteria 100 in step 204 then the NO branch of decisional step 204 leads to decisional step 208.

At decisional step 208, URI portion 28, which may have been transformed in step 206, is used to determine whether the content requested by request 26 is cached at cache server 16. If the requested content is not cached at cache server 16 then the NO branch of decisional step 208 leads to step 210. At step 210, cache server 16 forwards the untransformed version of request 26 to origin server 18 and retrieves the requested content. Next, at step 212, the requested content item is cached at cache server 16, if the requested content item is cacheable. As some content items are uncacheable or have been specified as uncacheable, the content item may not be cached. At step 214 the requested content item is returned to client 12. If the requested item is cached at cache server 16 then the YES branch of decisional step 208 is followed to step 214.

System 10 provides the capability to transform URLs so that header-dependent content may be cached by at a cache server. Existing web content caching systems which rely on the URL associated with the web content have previously lacked the capability to cache content which varied based on header information in the http request associated with the URL. System 10 provides the capability to transform the URL associated with header-dependent content such that caching systems can uniquely identify the header-dependent content using the associated URL.

In addition, system 10 may be used to provide additional functionality to cache servers and other systems. For example, the ability to include the URL of a referring site in a request's URL without the assistance of the referring site provides the capability to site administrators to exclude visitors from particular sites.

Other changes, substitutions and alterations are also possible without departing from the spirit and scope of the present invention, as defined by the following claims.

What is claimed is:

1. A method for communicating data, comprising:
receiving a first request, the first request comprising a first uniform resource identifier and a header portion, the first request requesting a content item as specified by the first uniform resource identifier and the header portion;
determining whether to transform the first request, the first request being transformed when at least a portion of the first request matches a transform criteria;
in response to transforming the first request, generating a second request based on a specific transform associated with the first request, the header portion, and the first uniform resource identifier, the second request being associated with the content item, the second request generated by performing an action associated with the specific transform based on the header portion and the first uniform resource identifier to yield a second uniform resource identifier, the second uniform resource identifier being different than the first uniform resource identifier, the first and second uniform resource identifiers being in a hypertext transport protocol;
determining whether the content item is stored in a cache based on the second uniform resource identifier; and
retrieving the content item from the cache in response to the content item being cached.

2. The method of claim 1, further comprising:
sending the first request to an origin server in response to the content item not being cached;
receiving the content item from the origin server;
providing the content item in response to the first request.

3. The method of claim 2, further comprising:
transforming the first request to the second request;
caching the content item at the cache based on the second uniform resource identifier of the second request.

4. The method of claim 1, wherein the second request uniquely identifies the content item that is originally header dependent using only the second uniform resource locator.

5. The method for communicating data according to claim 1, wherein the content item comprises a version of content associated with the first uniform resource identifier customized in response to data in the header portion associated with the first request.

6. The method of claim 1, wherein the specific transform utilizes a lookup table, wherein the lookup table corresponds to one or more combinations of the first uniform resource identifier and the header portion directly to the second uniform resource identifier.

7. The method of claim 1, further comprising:
in response to not transforming the first request, determining whether the content item is stored in a cache based on the first uniform resource identifier; and
retrieving the content item from the cache in response to the content item being cached.

8. A system for communicating data, comprising:
means for receiving a first request, the first request comprising a first uniform resource identifier and a header portion, the first request requesting a content item as specified by the first uniform resource identifier and the header portion;
means for determining whether to transform the first request, the first request being transformed when at least a portion of the first request matches a transform criteria;
in response to transforming the first request, means for generating a second request based on a specific transform associated with the first request, the header portion, and the first uniform resource identifier, the second request being associated with the content item, the second request generated by performing an action associated with the specific transform based on the header portion and the first uniform resource identifier to yield a second uniform resource identifier, the second uniform resource identifier being different than the first uniform resource identifier, the first and second uniform resource identifiers being in a hypertext transport protocol;
means for determining whether the content item is stored in a cache based on the second uniform resource identifier; and
means for retrieving the content item from the cache in response to the content item being cached.

9. The system of claim 8, further comprising:
means for sending the first request to an origin server in response to the content item not being cached;
means for receiving the content item from the origin server;
means for providing the content item in response to the first request.

10. The system of claim 9, further comprising:
means for transforming the first request to the second request;
means for caching the content item at the cache based on the second uniform resource identifier of the second request.

11. The system of claim 8, wherein the second request uniquely identifies the content item that is originally header dependent using only the second uniform resource locator.

12. The system of claim 8, wherein the content item comprises a version of content associated with the first uniform resource identifier customized in response to data in the header portion associated with the first request.

13. The system of claim 8, wherein the specific transform utilizes a lookup table, wherein the lookup table corresponds to one or more combinations of the first uniform resource identifier and the header portion directly to the second uniform resource identifier.

14. The system of claim 8, further comprising:
in response to not transforming the first request, means for determining whether the content item is stored in a cache based on the first uniform resource identifier; and
means for retrieving the content item from the cache in response to the content item being cached.

15. A non-transitory computer readable storage medium including code for communicating data, the code operable to:
receive a first request, the first request comprising a first uniform resource identifier and a header portion, the first request requesting a content item as specified by the first uniform resource identifier and the header portion;
determine whether to transform the first request, the first request being transformed when at least a portion of the first request matches a transform criteria;
in response to transforming the first request, generate a second request based on a specific transform associated with the first request, the header portion, and the first uniform resource identifier, the second request being associated with the content item, the second request generated by performing an action associated with the specific transform based on the header portion and the first uniform resource identifier to yield a second uniform resource identifier, the second uniform resource identifier being different than the first uniform resource identifier, the first and second uniform resource identifiers being in a hypertext transport protocol;
determine whether the content item is stored in a cache based on the second uniform resource identifier; and
retrieve the content item from the cache in response to the content item being cached.

16. The non-transitory computer readable storage medium of claim 15, wherein the code is further operable to:
send the first request to an origin server in response to the content item not being cached;
receive the content item from the origin server;
provide the content item in response to the first request.

17. The non-transitory computer readable storage medium of claim 16, wherein the code is further operable to:
transform the first request to the second request;
cache the content item at the cache based on the second uniform resource identifier of the second request.

18. The non-transitory computer readable storage medium of claim 15, wherein the second request uniquely identifies the content item that is originally header dependent using only the second uniform resource locator.

19. The non-transitory computer readable storage medium of claim 15, wherein the content item comprises a version of content associated with the first uniform resource identifier customized in response to data in the header portion associated with the first request.

20. The non-transitory computer readable medium of claim 15, wherein the specific transform utilizes a lookup table, wherein the lookup table corresponds to one or more combinations of the first uniform resource identifier and the header portion directly to the second uniform resource identifier.

21. The non-transitory computer readable medium of claim 15, wherein the code is further operable to:
in response to not transforming the first request, determine whether the content item is stored in a cache based on the first uniform resource identifier; and
retrieve the content item from the cache in response to the content item being cached.

* * * * *